United States Patent
Dossett

(10) Patent No.: US 7,084,217 B2
(45) Date of Patent: Aug. 1, 2006

(54) HIGH ACTIVITY POLYETHYLENE CATALYSTS PREPARED WITH BORATES REAGENTS

(75) Inventor: Stephen John Dossett, Aldershot (GB)

(73) Assignee: B.P. Chemicals Ltd., London (GB)

( * ) Notice: Subject to any disclaimer, the term of this patent is extended or adjusted under 35 U.S.C. 154(b) by 0 days.

(21) Appl. No.: 10/466,916

(22) PCT Filed: Jan. 30, 2002

(86) PCT No.: PCT/GB02/00407

§ 371 (c)(1),
(2), (4) Date: Dec. 11, 2003

(87) PCT Pub. No.: WO02/062858

PCT Pub. Date: Aug. 15, 2002

(65) Prior Publication Data

US 2004/0092678 A1 May 13, 2004

(30) Foreign Application Priority Data

Feb. 6, 2001 (EP) .................................. 01430005

(51) Int. Cl.
*C08F 4/643* (2006.01)
*C08F 4/646* (2006.01)
*C08F 4/649* (2006.01)

(52) U.S. Cl. ................... 526/124.6; 502/104; 502/115; 502/120; 502/132; 502/202; 526/124.8

(58) Field of Classification Search ................ 502/104, 502/115, 120, 125, 132, 202; 526/124.6, 526/124.8

See application file for complete search history.

(56) References Cited

U.S. PATENT DOCUMENTS

| 4,339,351 A | * | 7/1982 | Mashita et al. | ............. 502/115 |
| 4,378,304 A | * | 3/1983 | Dombro | ..................... 502/111 |
| 4,530,912 A | * | 7/1985 | Pullukat et al. | ............. 502/104 |
| 5,541,271 A | * | 7/1996 | Sano et al. | ................. 526/129 |

FOREIGN PATENT DOCUMENTS

| EP | 0 376 188 A2 | 7/1990 |
| EP | 0 497 102 A2 | 8/1992 |
| WO | WO93/09147 | 5/1993 |

* cited by examiner

*Primary Examiner*—Caixia Lu
(74) *Attorney, Agent, or Firm*—Finnegan, Henderson, Farabow, Garrett & Dunner, L.L.P.

(57) ABSTRACT

An improved supported Ziegler-Natta catalyst especially useful for olefin polymerisation, the catalyst including a carrier, an organomagnesium compound, a borate compound, and one transition metal compound.

13 Claims, No Drawings

HIGH ACTIVITY POLYETHYLENE CATALYSTS PREPARED WITH BORATES REAGENTS

BACKGROUND OF THE INVENTION

The present invention relates to a method for polymerising olefins, a catalyst for such a polymerisation and a method for producing such a catalyst. A particular aspect of the present invention relates to a method for producing linear low density copolymers of ethylene, hereinafter referred to as "LLDPE" and high density polymers, hereinafter referred to as "HDPE".

The present invention is particularly suitable for the co-polymerisation of olefins in the gas phase. Such gas phase polymerisation processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

Linear low density polyethylene polymers possess properties which distinguish them from other polyethylene polymers such as high density polymers, including homopolymers of polyethylene. Certain of these properties are described in the Anderson et al U.S. Pat. No. 4,076,698.

When the polyethylene resins are fabricated into products, it is imperative to control the molecular weight distribution of the resins since, as is known to those skilled in the art, the properties of the products can be predicted from the molecular weight distribution of the resins.

One of the measures of the molecular weight distribution of the resin is melt flow ratio (MFR), which is the ratio of high load melt index (HLMI or $I_{21}$) to melt index (MI or $I_2$) for a given resin. MFR is defined herein as the ratio of the high load melt index (HLMI or $I_{21}$) divided by the melt index (MI or $I_2$). The melt flow ratio is believed to be an indication of the molecular weight distribution of the polymer, the higher the value, the broader the molecular weight distribution. Resins having relatively low MFR values, e.g., of about 20 to about 45, preferably 20 to 35, have relatively narrow molecular weight distributions. Additionally, LLDPE resins having such relatively low MFR values produce films of better strength properties than resins with high MFR values.

For higher density polyethylene the n value can be used as a measure of the molecular weight distribution of the polymer. This n value is calculated as $[\log_{10}(I_{8.5}/I_{0.325})]/[\log_{10}(8.5/0.325)]$ where $I_{8.5}$ and $I_{0.325}$ are the melt indexes measured under 8.5 Kg and 0.325 Kg respectively. The higher the n value, the broader the polymer molecular weight distribution.

The molecular weight of the ethylene (co)polymers may be controlled in a known manner, e.g., by using hydrogen. With the catalysts produced according to the present invention, molecular weight may be suitably controlled with hydrogen when the polymerisation is carried out at relatively low temperatures, e.g., from about 30° C. to about 115° C. This control of molecular weight may be evidenced by a measurable positive change in melt index ($I_2$) of the polymer produced. For HDPE production it is essential that the catalyst used has a sufficiently high response to hydrogen since hydrogen will decrease the catalyst activity. It is therefore important that such catalysts produce polymers with the required molecular weight, using the minimum of hydrogen.

It is therefore a primary object of the present invention to provide a high activity catalyst for the polymerisation of olefins yielding LLDPE products of a relatively narrow molecular weight distribution. It is an additional object of the present invention to provide a catalytic process for polymerising olefins which yields polyethylene of a relatively narrow molecular weight distribution at high productivity.

It is also a primary object of the present invention to provide a high activity catalyst for the polymerisation of olefins yielding HDPE products of the required molecular weight distribution. It is an additional object of the present invention to provide a catalytic process for polymerising olefins which yields polyethylene of a required molecular weight distribution at high productivity.

It is a further object of the present invention to provide a high activity catalyst for the polymerisation of olefins which yields polyethylene of narrow molecular weight distributions, high melt indices and exceptionally low weight swell. Such resins are particularly useful for injection moulding and rotational moulding applications.

SUMMARY OF THE INVENTION

A supported olefin polymerisation catalyst composition of the present invention is prepared in a multi-step process. In the first step, a mixture of a solid, porous carrier and a non-polar solvent is contacted with at least one organomagnesium compound of the formula $$R_m MgR'_n$$

where R and R' are the same or different alkyl groups, preferably $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is 2, and optionally, an organoaluminium containing compound.

Subsequently, the mixture of the first step is optionally contacted with at least one chlorinating agent (X).

Subsequently, the mixture is contacted with borate compounds, preferably a hydrocarbyloxyborate of general formulae, $BR_n(OR')_{3-n}$ or $BX_n(OR')_{3-}$ or a cyclic boroxine of the general formula $B_3O_3R_3(OR')_{3-n}$ wherein R=alkyl, aryl or alkylaryl; R'=alkyl, aryl or alkylaryl; X=F, Cl, Br or I and n=0,1,2 or 3. Preferred, but not limiting examples of trialkoxy borates include $B(OCH_3)_3$, $B(OC_2H_5)_3$, $B(OC_3H_7)_3$, $B(OC_4H_9)_3$, $B(OC_5H_{11})_3$; preferred, but not limiting examples of triaroxy borates are triphenoxy borate $B(OC_6H_5)_3$ or phenyl substituted triaroxy borates.

The mixture is then contacted with at least one transition metal compound soluble in the non-polar solvent. The resulting mixture is subsequently contacted with an organometallic compound.

The resulting activated catalyst composition has substantially higher productivity in the polymerisation of olefins, than similar catalyst compositions prepared without borate compound or using, for example siloxanes compounds in place of said borate compound. The catalyst also produces polymers having the required molecular weight distributions for polymers with a wide range of densities. The catalysts also show excellent hydrogen response for the production of HDPE polymers.

DETAILED DESCRIPTION OF THE INVENTION

In accordance with an aspect of the present invention, supported titanium is incorporated onto a suitable support by impregnating this support with reactive magnesium and utilising this supported reactive magnesium to react with tetravalent titanium (i.e. titanium in the plus 4 valence state) in a liquid medium. Unreacted titanium is soluble in this liquid medium, while reacted titanium and supported reactive magnesium are insoluble in this liquid medium.

As used herein, the concept of supporting a material on a carrier is intended to connote the incorporation of material (e.g. magnesium compounds and/or titanium compounds) onto the carrier by physical or chemical means. Accordingly, supported material need not necessarily be chemically bound to the carrier.

Suitable carrier materials which may be treated include solid, porous carrier materials such as silica, alumina and combinations thereof. Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g. spray dried silica.

The carrier material is also porous. The internal porosity of these carriers may be larger than 0.2 cm³/g. The specific surface area of these carriers is at least 3 m²/g, preferably at least about 50 m²/g, and more preferably from, e.g., about 150 to about 1500 m²/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which change of state or sintering occurs. A suitable range of temperatures may, thus, be from about 100° C. to about 800° C., e.g., from about 150° C. to about 700° C.

Silanol groups represented by the presence of Si—OH groups in the carrier, may be present when the carrier is contacted with water-reactive magnesium compounds in accordance with an aspect of the present invention. These Si—OH groups may be present at about 0.3 mmoles or more per gram of carrier. Accordingly, an amount of, e.g., from about 0.5 to about 5 mmoles of OH groups per gram of carrier may be present, but a preferred range is from about 0.3 to about 0.9 mmoles of OH groups per gram of carrier. Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at least 500° C. to about 800° C., most especially, from about 550° C. to about 700° C. The duration of heating may be from 4 to 16 hours. In a most preferred embodiment, the carrier is silica which, prior to the use thereof in the first catalyst synthesis step, has been dehydrated by fluidising it with nitrogen or air and heating at 700° C. for at least 4 hours to achieve a surface hydroxyl group concentration of about 0.6 millimoles per gram. The surface hydroxyl concentration of silica may be determined according to J. B. Peri and A. L. Hensley, Jr., J. Phys. Chem., 72 (8), 2926 (1968). The silica of the most preferred embodiment is a high surface area, amorphous silica (surface area=280 to 350 m²/g; pore volume of 1.55 cm³/g), and it is a material marketed under the tradename of ES70 by Crosfield. When silica has been dehydrated by fluidising with nitrogen or air and heated at about 700° C. for about 5 hours, then the surface hydroxyl concentration is about 0.55 mmols/g.

While heating is a preferred means of removing OH groups, inherently present in a carrier such as silica, other removal means are also possible such as chemical means. For example, a desired proportion of OH groups may be reacted with a chemical agent such as a hydroxyl reactive aluminium compound, e.g. triethylaluminum.

Other examples of suitable carrier materials are described in the Graff, U.S. Pat. No. 4,173,547. Note particularly the passage extending from column 3, line 62 to column 5, line 44 of this Graff patent. It is noted that internal porosity of carriers can be determined by a technique termed BET-technique, described by S. Brunauer, P. Emmett and E. Teller in Journal of the American Chemical Society, 60, pp. 209–319 (1938). Specific surface areas of carriers can also be measured in accordance with the above-mentioned BET-technique, with use of the standardised method as described in British Standards BS 4359, Volume 1, (1969).

The carrier material is slurried in a non-polar solvent and the resulting slurry is contacted with at least one organomagnesium compound. The slurry of the carrier material in the solvent is prepared by introducing the carrier into the solvent, preferably while stirring, and heating the mixture to about 25° C. to about 100° C., preferably to about 35° C. to about 75° C. The slurry is then contacted with the aforementioned organomagnesium compound, while the heating is continued at the aforementioned temperature.

The organomagnesium compound has the empirical formula

where R and R' are the same or different alkyl groups, preferably $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n is 2.

Suitable non-polar solvents are materials in which all of the reactants used herein, e.g., the organomagnesium compound, the optional chlorinating agent and organoaluminium compound, the borate compound, and the transition metal compound, are at least partially soluble. Preferred non-polar solvents are alkanes, such as isopentane, hexane, n-heptane, octane, nonane, and decane, although a variety of other materials including cycloalkanes, such as cyclohexane, aromatics, such as benzene and ethylbenzene, may also be employed. The most preferred non-polar solvents are isopentane, hexane, and heptane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Furthermore, it is believed that the molar amount of the organomagnesium compound deposited onto the support is greater than the molar content of the hydroxyl groups on the support. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the reagents added subsequently, thereby forming a precipitate outside of the support which is detrimental in the synthesis of our catalyst and must be avoided. The amount of the organomagnesium compound which is not greater than that deposited onto the support can be determined in any conventional manner, e.g., by adding the organomagnesium compound to the slurry of the carrier in the solvent, while stirring the slurry, until the organomagnesium compound is detected in the solvent.

For example, for the silica carrier heated at about 700° C., the amount of the organomagnesium compound added to the slurry is such that the molar ratio of Mg to the hydroxyl groups (OH) on the solid carrier is about 1:1 to about 4:1, preferably about 1.1:1 to about 2.8:1, more preferably about 1.2:1 to about 2:1 and most preferably about 1.8:1. The organomagnesium compound dissolves in the non-polar solvent to form a solution from which the organomagnesium compound is deposited onto the carrier.

It is also possible to add such an amount of the organomagnesium compound which is in excess of that which will be deposited onto the support, and then remove, e.g., by filtration and washing, any excess of the organomagnesium compound.

The amount of magnesium compound which is impregnated onto the carrier should be sufficient to react with the borate compound and then the tetravalent titanium compound in order to incorporate a catalytically effective amount of titanium on the carrier in the manner set forth hereinbelow. When a liquid containing an organomagnesium compound is contacted with a carrier, the amount of magnesium in this liquid in terms of mmoles may be essentially the same as that stated above with respect to that which is impregnated onto the carrier.

Optional components in the production of the catalyst composition of the invention are a chlorinating agent (X) and an organoaluminium compound. The aluminium component can be added to the slurry before, after or with the reactive magnesium compound. The organoaluminium compound can be chosen from a range of known alkylaluminiums or alkylaluminium halides including those having the formula $AlR_nX_{3-n}$ wherein R is the same or different and is an alkyl group, X is a halide and n=0,1,2 or 3. The chlorinating agent can be added to the slurry before, after or with the borate compound. The chlorinated compound (X) can be chosen from a range of known chlorinating agents, including those having the formula $R_nSiCl_{4-n}$, wherein each R is the same or different and is hydrogen or an alkyl group, preferably a $C_1$–$C_{12}$ alkyl group, and n is an integer from 0 to 3, e.g. silicon tetrachloride. Alternative agents include HCl, BuCl, $CCl_4$, chlorocyclohexane and trichloroethane. This contacting step is usually conducted at a temperature comprised between 25° C. and 100° C., preferably between 40° C. and 60° C. The chlorinated compound (X) is added to the slurry in an amount such to provide a molar ratio of (X:Mg) of 0.1 to 4.0, preferably about 0.1 to about 3.0, more preferably about 0.1 to 2.5.

The borate compounds used in the present invention have the general formulae, $BR_n(OR')_{3-n}$, $BX_n(OR')_{3-n}$, or $B_3O_3R_3(OR)_{3-n}$ wherein R=alkyl, aryl or alkylaryl; R'=alkyl, aryl or alkylaryl; X=F,Cl,Br or I and n–0,1,2 or 3. Preferred, but not limiting examples of trialkoxy borates include $B(OCH_3)_3$, $B(OC_2H_5)_3$, $B(OC_3H_7)_3$, $B(OC_4H_9)_3$, $B(OC_5H_{11})_3$; preferred, but not limiting examples of triaroxy borates are triphenoxy borate $B(OC_6H_5)_3$ or phenyl substituted triaroxy borates.

The slurry of the carrier material and of the organomagnesium compound in the solvent is maintained at temperatures of about 40° C. to about 60° C., before the introduction of the borate compound. The borate compound is preferably introduced after organomagnesium incorporation and before the transition metal incorporation into the catalyst. The amount of the borate compound added to the slurry is such that the molar ratio of the borate compound to Mg is about 0.20 to about 1.3.

The slurry is contacted with at least one transition metal compound soluble in the non-polar solvent, preferably after the addition of the borate compound is completed. This synthesis step is conducted at about 25° C. to about 70° C., preferably at about 40° C. to about 60° C., and most preferably at about 45° C. to about 60° C. In a preferred embodiment, the amount of the transition metal compound added is not greater than that which can be deposited onto the carrier. Said transition metal loading is preferably comprised between 0.5 and 3 mmol of transition metal per g of carrier, e.g. $SiO_2$. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° C. to about 850° C., the amount of the transition metal compound is such that the molar ratio of the transition metal, derived from the transition metal compound, to the hydroxyl groups of the carrier is about 0.25 to about 2.0, preferably about 1.3 to about 2.0. Usually, the amount of the transition metal compound is also such that the molar ratio of Mg to the transition metal is about 0.5 to about 3, preferably about 1 to about 2.

Suitable transition metal compounds used herein are compounds of metals of Groups 4, 5, or 6 as adopted by the new IUPAC notation, providing that such compounds are soluble in the non-polar solvents. Non-limiting examples of such compounds are titanium halides, e.g., titanium tetrachloride, titanium alkoxides e.g., where the alkoxide moiety contains an allyl radical of 1 to 6 carbon atoms or combinations, vanadium halides, and vanadium alkoxides. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included. Any transition metal compound that may be used alone may also be used in conjunction with other transition metal compounds.

The reaction of the transition metal compound, such as the tetravalent titanium compound, in the liquid medium conveniently takes place by slurrying the solid carrier containing the reactive magnesium species in a solution of the tetravalent titanium compound and heating the reaction medium to a suitable reaction temperature. Preferred solvents for the tetravalent titanium compound are hexane or isopentane or heptane.

The supported catalyst precursor formed from the components described above is then activated with suitable activators. Suitable activators include organometallic compounds. Preferably, the activators are organoaluminum compounds, preferably trialkylaluminum compounds which contain alkyl groups of 1 to 6 carbon atoms, preferably of 1 to 4. More preferably, the activators are triethylaluminum or trimethylaluminum.

The catalyst may be activated in situ by adding the activator and catalyst precursor separately to the polymerisation medium. It is also possible to combine the catalyst precursor and activator before introduction into the polymerisation medium, e.g., for up to about 2 hours at a temperature from about −40° C. to about 80° C.

A suitable activating amount of the activator may be used. The number of moles of activator per gram atom of titanium in the catalyst may be, e.g., from about 1 to about 100 and is preferably greater than about 5.

In one embodiment of the present invention, olefin(s), preferably ethylene or propylene or combinations thereof are prepolymerised in the presence of the catalyst or catalyst system of the present invention prior to the main polymerisation. The prepolymerisation can be carried out batchwise or continuously in gas, solution or slurry phase including at elevated pressures. The prepolymerisation can take place with any olefin monomer or combination and/or in the presence of any molecular weight controlling agent such as hydrogen. For details on prepolymerisation see U.S. Pat. Nos. 4,923,833, 5,283,278 and 4,921,825 and EP-B-0279 863 all of which are herein fully incorporated by reference.

In another embodiment of the invention, the supported catalyst system of the invention includes an antistatic agent, for example, those described in U.S. Pat. No. 5,283,278, which is fully incorporated herein by reference. Non-limiting examples of antistatic agents include, alcohol, thiol, silanol, diol, ester, ketone, aldehyde, acid, amine, and ether compounds. Tertiary amines, ethoxylated amines, and polyether compounds are preferred. The antistatic agent can be added at any stage in the formation of the supported catalyst system of the invention.

In another embodiment of the invention, the supported catalyst system of the invention includes a polyolefin wax or tackifier or the like.

Olefins may be polymerised with the catalysts prepared according to aspects of the present invention by any suitable process. Such processes include polymerisation's carried out in suspension, in solution or in the gas phase. Gas phase polymerisation's are preferred such as those taking place in stirred bed reactors and, especially, fluidised bed reactors.

The process according to the present invention is thus particularly suitable for the manufacture of polymers in a continuous gas fluidised bed process. In an advantageous embodiment of this invention, the polymer is a polyolefin preferably copolymers of ethylene and/or propylene and/or butene. Preferred olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or. more C4–C8 alphaolefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the C4–C8 monomer are dec-1-ene and ethylidene norbornene. According to a preferred embodiment, the process of the present invention preferably applies to the manufacture of polyolefins in the gas phase by the copolymerisation of ethylene with but-1-ene and/or hex-1-ene and/or 4-methylpent-1-ene.

The process according to the present invention may advantageously be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon(s), such as C4–C8 alkane(s) or cycloalkane(s), particularly butane, pentane or hexane. Ethane or propane may also be used as inert hydrocarbons.

The process is particularly suitable for polymerising olefins at an absolute pressure of between 0.5 and 6 MPa and at a temperature of between 30° C. and 130° C. For example for LLDPE production the temperature is suitably in the range 75–90° C. and for HDPE the temperature is typically 80–105° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

In one embodiment the reactor used in the present invention is capable of producing greater than 300 Kg/hr to about 80,000 Kg/hr or higher of polymer, preferably greater than 10,000 Kg/hr.

It is essential to operate the fluid bed reactor at a temperature below the sintering temperature of the polymer particles. For the production of ethylene copolymers in the process of the present invention an operating temperature of about 30° C. to 115° C. is preferred. Temperatures of about 75° C. to 90° C. are used to prepare products having a density of about 0.91 to 0.92, and temperatures of about 80° C. to 100° C. are used to prepare products having a density of about 0.92 to 0.94, and temperatures of about 90° C. to 115° C. are used to prepare products having a density of about 0.94 to 0.96.

The fluid bed reactor is operated at pressures of up to about 1000 psi, and is preferably operated at a pressure of from about 150 to 350 psi, with operation at the higher pressures in such ranges favouring heat transfer since an increase in pressure increases the unit volume heat capacity of the gas.

The partially or completely activated catalyst is injected into the bed at a rate equal to its consumption. The production rate of the bed is controlled by the rate of catalyst injection. The production rate may be increased by simply increasing the rate of catalyst injection and decreased by reducing the rate of catalyst injection.

Since any change in the rate of catalyst injection will change the rate of generation of the heat of reaction, the temperature of the recycle gas is adjusted upwards or downwards to accommodate the change in rate of heat generation. This insures the maintenance of an essentially constant temperature in the bed.

The molecular weight of the polymer may be controlled in a known manner, preferably by using hydrogen. With the catalysts produced according to aspects of the present invention, molecular weight may be suitably controlled with hydrogen when the polymerisation is carried out at relatively low temperatures, e.g., from about 30° C. to about 115° C. This control of molecular weight may be evidenced by a measurable positive change in melt index ($I_2$) for the polymer produced.

The catalysts prepared according to aspects of the present invention are highly active and are useful for the production of both linear low density and high density polyethylene polymers. Such linear low density polyethylene polymers may have a density of 0.94 g/cc or less, preferably 0,930 or less or even 0.925 g/cc or less. In accordance with certain aspects of the present invention, it is possible to achieve densities of less than 0.915 g/cc and even 0.900 g/cc or less.

Advantageous properties of linear low density polyethylene polymers are described in the Anderson et al U.S. Pat. No. 4,076,698. These linear low density polyethylene polymers may be polymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting linear low density polyethylene polymer preferably has at least one other alphaolefin comonomer having at least four carbon atoms in an amount of, e.g. at least 1 percent by weight of the polymer. Accordingly, ethylene/propylene copolymers are possible, but not preferred.

The molecular weight distribution of the polymers prepared in the presence of the catalysts of the present invention, as expressed by the MFR values, varies from about 20 to 35 for LLDPE products having a density of about 0.900 to about 0.940 g/cc, and an $I_2$ (melt index) of about 0.1 to about 100. As is known to those skilled in the art, such MFR values are indicative of a relatively narrow molecular weight distribution of the polymer. As is also known to those skilled in the art, such MFR values are indicative of polymers especially suitable for injection moulding applications since polymers having such MFR values exhibit relatively low amounts of warpage and shrinkage on cooling of the injection moulded products. The relatively low MFR values of polymers prepared with the catalysts of this invention also indicate that they are suitable for the preparation of various film products since such films are likely to have excellent strength properties.

The linear low density polyethylene polymers produced in accordance with certain aspects of the present invention preferably contain at least about 80 percent by weight of ethylene units. Most preferably, the linear low density copolymers of the invention contain at least 2 weight percent, for example from 2 to 20 weight percent of an alpha olefins copolymerised therein.

The molecular weight distribution of the polymers prepared in the presence of the catalysts of the present invention, as expressed by the MFR values, varies from about 20 to 35 for LLDPE products having a density of about 0.900 to about 0.940 g/cc, and an $I_2$ (melt index) of about 0.1 to about 100. As is known to those skilled in the art, such MFR values are indicative of a relatively narrow molecular weight distribution of the polymer. As is also known to those skilled in the art, such MFR values are indicative of polymers especially suitable for injection moulding applications since polymers having such MFR values exhibit relatively low amounts of warpage and shrinkage on cooling of the injection moulded products. The relatively low MFR values of polymers prepared with the catalysts of this invention also indicate that they are suitable for the preparation of various film products since such films are likely to have excellent strength properties.

The following Examples give examples of reactants and parameters which may be used in accordance with aspects of the present invention.

EXAMPLES

All manipulations were carried out using air free techniques.

Catalyst Precursor Preparation

Examples 1–6

Into a 1 litre vessel, equipped with stirrer, was placed 20 g silica (previously calcined to 700° C. for 5 hr under N2) and 200 ml hexane. The slurry was stirred at 250 rpm and 50° C. Dibutylmagnesium (20 mmol) was added to this slurry at 50° C. and the mixture was stirred at this temperature for 1 hr. Next $B(OR)_3$ R=methyl, ethyl, iso-Prpoyl, butyl, amyl and phenyl (11.73 mmol) was added and the mixture stirred for 2 hrs at 50° C. Finally, TiC14 (20 mmol) was added and the mixture was stirred for a further hour at 50° C. The solvent was removed by evaporation under a strong nitrogen flow, followed by vacuum to yield a free-flowing powder.

Examples 7–13

Into a 1 litre vessel, equipped with stirrer, was placed 20 g silica (previously calcined to 700° C. for 5 hr under N2) and 200 ml hexane. The slurry was stirred at 250 rpm and 50° C. Dibutylmagnesium (20 mmol) was added to this slurry at 50° C. and the mixture was stirred at this temperature for 1 hr. Next $B(OR)3$ R=methyl, ethyl, iso-prpoyl, butyl,amyl and phenyl (17.60 mmol) was added and the mixture stirred for 2 hrs at 50° C. Finally, TiC14 (20 mmol) was added and the mixture was stirred for a further hour at 50° C. The solvent was removed by evaporation under a strong nitrogen flow, followed by vacuum to yield a free-flowing powder.

Polymerization

LLDPE Test

Ethylene/1-hexene copolymers were prepared with these catalyst precursors and the cocatalyst triethylaluminum (TEAL). The procedure is described below.

A 5 litre stainless-steel autoclave equipped with a magnet stirrer was filled with hexane (1200 ml) and 3.0 mmol of cocatalyst at ambient temperature. The reactor was briefly vented to lower the pressure, closed and the stirring increased to 700 rpm. Hexene was then introduced, sufficient to give LLDPE product (<0.920 density), and the temperature was increased to 85° C. The internal pressure was raised with hydrogen (sufficient to give melt index between 1 and 7) and then ethylene (2.8 bar) was introduced. Catalyst precursor was then injected using ethylene, such that the total ethylene pressure was between 4 and 5 bar. The polymerization reaction was carried out for 1 hour unless, otherwise stated, and then the ethylene supply was stopped. The reactor was allowed to cool to ambient temperature and the polyethylene was collected and dried in air overnight. Given in Table 1 are the catalyst productivities, polymer flow indexes and MFR values, and densities of the polymer.

TABLE 1

| Example | Catalyst | borate | PC2H4 bar | PH2 bar | C6 vol(mls) | Activity gPoly/g/hr/b | I2(2.16) | MFR(21, 6/2, 16) powder | Density(g/cc) powder |
|---|---|---|---|---|---|---|---|---|---|
| 1 | GP599 | butyl* | 4 | 0.7 | 320 | 1500 | 1.3 | 30 | 0.914 |
| 2 | GP602 | phenyl | 4 | 0.7 | 320 | 1220 | 3.4 | 31 | 0.9185 |
| 3 | GP572 | ethyl | 4 | 0.7 | 320 | 1150 | 1.1 | 30 | 0.915 |
| 4 | GP607 | amyl | 4 | 0.7 | 320 | 1125 | 0.95 | 30 | 0.914 |
| 5 | GP593 | isopropyl | 4 | 0.7 | 320 | 970 | 1.7 | 30 | 0.917 |
| 6 | GP605 | methyl | 4 | 0.7 | 320 | 770 | 0.95 | 28 | 0.9175 |
| 7 | SS592 | isopropyl | 4 | 0.7 | 360 | 970 | 1.7 | 29 | 0.914 |
| 8 | SS601 | phenyl | 4 | 0.7 | 360 | 920 | 6.3 | 28 | 0.913 |
| 9 | SS598 | butyl | 4 | 0.7 | 360 | 780 | 0.9 | 28 | 0.916 |
| 10 | SS573 | ethyl | 4 | 0.7 | 360 | 760 | 1.1 | 27 | 0.914 |
| 11 | SS606 | amyl | 4 | 0.7 | 360 | 745 | 0.65 | 29 | 0.915 |
| 12 | SS604 | methyl | 4 | 0.7 | 360 | 415 | 0.65 | 31 | 0.9205 |

*Test duration 35 mins

The invention claimed is:

1. A process for the preparation of a supported olefin polymerisation catalyst composition consisting essentially of the consecutive steps of
   (a) mixing a solid, porous carrier in a non-polar solvent to form a mixture thereof,
   (b) contacting said mixture with at least one organomagnesium compound of the formula $R_mM_gR'_n$, where R and R' are the same or different alkyl groups, and m and n are each 0, 1 or 2, providing that m+n is 2, and optionally, at least one organoaluminium containing compound,
   (c) optionally contacting the resulting mixture from (b) with at least one chlorinating agent (X),
   (d) subsequently, contacting the resulting mixture from (b) or (c) with at least one borate compound, and
   (e) contacting the resulting mixture from (d) with at least one transition metal compound soluble in the non-polar solvent.

2. The process for the preparation of a supported olefin polymerisation catalyst according to claim 1, wherein the alkyl groups of the organomagnesium compound are $C_2$–$C_{12}$ alkyl groups.

3. The process for the preparation of a supported olefin polymerisation catalyst according to claim 1, wherein the borate compound is a hydrocarbyloxyborate of formulae, $BR_n(OR')_{3-n}$ or $BX_n(OR')_{3-n}$ or a cyclic boroxine of the formula $B_3O_3R_3(OR)_{3-n}$ wherein R=alkyl, aryl or alkylaryl; R'=alkyl, aryl or alkylaryl; X=F, Cl, Br or I and n=0, 1, 2 or 3.

4. The process for the preparation of a supported olefin polymerisation catalyst according to claim 3, wherein the borate compound is a borate of the formulae $B(OCH_3)_3$, $B(OC_2H_5)_3$, $B(OC_3H_7)_3$, $B(OC_4H_9)_3$, $B(OC_5H_{11})_3$, $B(OC_6H_5)_3$ or a phenyl substituted triaroxy borate.

5. A supported olefin polymerisation catalyst made by the process of claim 1.

6. The process for the preparation of a supported olefin polymerisation catalyst according to claim 2, wherein the alkyl groups are $C_4$–$C_{10}$ alkyl groups.

7. The process for the preparation of a supported olefin polymerisation catalyst according to claim 6, wherein the alkyl groups are $C_4$–$C_8$ alkyl groups.

8. The process for the preparation of a supported olefin polymerisation catalyst according to claim 7, wherein the alkyl groups are butyl groups.

9. A process for polymerization of an olefin comprising polymerizing an olefin in the gas phase in the presence of the catalyst of claim 5.

10. The process of claim 9, wherein the olefin is polymerized in a gas fluidized bed reactor.

11. The process of claim 9 or 10 wherein the olefin is polymerized in the presence of an organoaluminium compound as a cocatalyst.

12. The process of claim 11, wherein the organoaluminium compound is an alkyl aluminum compound.

13. The process of claim 12, wherein the alkyl aluminum compound is a trialkyl aluminum compound.

* * * * *